US012363755B2

(12) United States Patent
Wei et al.

(10) Patent No.: US 12,363,755 B2
(45) Date of Patent: Jul. 15, 2025

(54) INFRASTRUCTURE EQUIPMENT, COMMUNICATIONS DEVICE AND METHODS

(71) Applicant: Sony Group Corporation, Tokyo (JP)

(72) Inventors: Yuxin Wei, Basingstoke (GB); Anders Berggren, Lund (SE); Vivek Sharma, Basingstoke (GB); Yassin Aden Awad, Basingstoke (GB); Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 140 days.

(21) Appl. No.: 17/428,286

(22) PCT Filed: Jan. 14, 2020

(86) PCT No.: PCT/EP2020/050816
§ 371 (c)(1),
(2) Date: Aug. 4, 2021

(87) PCT Pub. No.: WO2020/164837
PCT Pub. Date: Aug. 20, 2020

(65) Prior Publication Data
US 2022/0070920 A1 Mar. 3, 2022

(30) Foreign Application Priority Data
Feb. 14, 2019 (EP) ..................... 19157264

(51) Int. Cl.
*H04W 74/08* (2024.01)
(52) U.S. Cl.
CPC .................. *H04W 74/08* (2013.01)
(58) Field of Classification Search
CPC ............. H04W 74/08; H04W 72/51; H04W 74/008; H04W 74/0833; H04W 74/002;
(Continued)

(56) References Cited

U.S. PATENT DOCUMENTS

2009/0042582 A1* 2/2009 Wang ................ H04W 74/0866
455/450
2010/0240367 A1* 9/2010 Lee ................... H04W 36/0077
455/435.2
(Continued)

FOREIGN PATENT DOCUMENTS

CA          3057464 A1    9/2018
WO     2020/164855 A1    8/2020

OTHER PUBLICATIONS

International Search Report and Written Opinion mailed on Jan. 14, 2020, received for PCT Application PCT/EP2020/050816, Filed on Mar. 17, 2020, 10 pages.
(Continued)

*Primary Examiner* — Quoc Thai N Vu
(74) *Attorney, Agent, or Firm* — XSENSUS, LLP

(57) ABSTRACT

An infrastructure equipment forming part of a wireless communications network for transmitting data to or receiving data from a plurality of communications devices is provided. The infrastructure equipment providing a cell having a coverage area in which the plurality of communications devices are located. The infrastructure equipment comprises circuitry configured to transmit signals to the communications devices via a wireless access interface provided by the wireless communications network, receive signals from the communications devices via the wireless access interface, transmit to the plurality of communications devices an indication of one or more of a plurality of uplink data transmission configurations, receive a first signal comprising a random access preamble and uplink data from one of the communications devices, and transmit a random access response message to the one of the communications devices.

20 Claims, 7 Drawing Sheets

(58) Field of Classification Search
CPC ............... H04W 74/006; H04W 48/10; H04W 72/02; H04W 72/12
See application file for complete search history.

(56) References Cited

U.S. PATENT DOCUMENTS

| | | | |
|---|---|---|---|
| 2015/0305062 A1* | 10/2015 | Sung | H04W 74/002 370/329 |
| 2016/0007358 A1* | 1/2016 | Yanagisawa | H04W 52/244 370/329 |
| 2018/0205516 A1 | 7/2018 | Jung et al. | |
| 2018/0279186 A1 | 9/2018 | Park | |
| 2018/0279376 A1 | 9/2018 | Dinan et al. | |
| 2021/0385879 A1* | 12/2021 | Mahalingam | H04W 72/1263 |

OTHER PUBLICATIONS

Holma et al., "LTE for UMTS OFDMA and SC-FDMA Based Radio Access", John Wiley & Sons, 2009, pp. 25-27.

Huawei et al., "UL data transmission in RRC_Inactive", 3GPP TSG-RAN WG2 #96, R2-168544, Nov. 14-18, 2016, pp. 1-8.

Ericsson, "Baseline solution for small data transmission in RRC_Inactive", 3GPP TSG-RAN WG2 #96, Tdoc R2-168713, Nov. 14-18, 2016, 7 pages.

Ericsson, "Revised WID for Further Enhanced MTC for LTE", 3GPP TSG RAN Meeting #73, RP-161464, Sep. 19-22, 2016, 6 pages.

Huawei et al., "Revised work item proposal: Enhancements of NB-Iot", 3GPP TSG RAN Meeting #73, RP-161901, Sep. 19-22, 2016, 8 pages.

Ericsson et al., "New WID on Even further enhanced MTC for LTE", 3GPP TSG RAN Meeting #75, RP-170732, Mar. 6-9, 2017, 4 pages.

Huawei et al., "New WID on Further NB-IoT enhancements", #3GPP TSG RAN Meeting #75, RP-170852, Mar. 6-9, 2017, 6 pages.

NTT Docomo, Inc., "Revised WID on New Radio Access Technology", 3GPP TSG RAN Meeting #78, RP-172834, Dec. 18-21, 2017, 11 pages.

ZTE Corporation et al., "New work item: 2-step RACH for NR", 3GPP TSG RAN Meeting #82, RP-182894, Dec. 10-13, 2018, 5 pages.

3Gpp, "Study on NR-based access to unlicensed spectrum (Release 16)", 3GPP TR 38.889 V16.0.0, Dec. 2018, pp. 1-119.

3GPP, "Evolved Universal Terrestrial Radio Access (E-UTRA); Physical layer procedures", 3GPP TS 36.213 V12.8.0, Dec. 2015, 224 pages.

* cited by examiner

INFRASTRUCTURE EQUIPMENT, COMMUNICATIONS DEVICE AND METHODS

CROSS-REFERENCE TO RELATED APPLICATIONS

The present application is based on PCT filing PCT/EP2020/050816, filed Jan. 14, 2020, which claims the priority of European patent application no. EP 19157264.3, filed Feb. 14, 2019, the contents of each are hereby incorporated by reference.

BACKGROUND

Field of Disclosure

The present disclosure relates to infrastructure equipment which are configured to transmit data to and receive data from communications devices in a wireless communications network, in accordance with an enhanced random access (RACH) procedure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things" or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

As such, embodiments of the present technique can provide an infrastructure equipment forming part of a wireless communications network for transmitting data to or receiving data from a plurality of communications devices. The infrastructure equipment providing a cell having a coverage area in which the plurality of communications devices are located. The infrastructure equipment comprises transmitter circuitry configured to transmit signals to the communications devices via a wireless access interface provided by the wireless communications network, receiver circuitry configured to receive signals from the communications devices via the wireless access interface, and controller circuitry configured in combination with the receiver circuitry and the transmitter circuitry to transmit to the plurality of communications devices an indication of one or more of a plurality of uplink data transmission configurations, the uplink data transmission configurations each defining different values of a set of one or more communications parameters in accordance with which the plurality of communications devices are to transmit uplink data to the infrastructure equipment, to receive a first signal comprising a random access preamble and uplink data from one of the communications devices, and to transmit a random access response message to the one of the communications devices. The one or more of the plurality of uplink data transmission configurations defining the values of the communications parameters in accordance with which the uplink data of the first signal is received by the infrastructure equipment is dependent on a distance between the one of the communications devices and the infrastructure equipment.

Embodiments of the present technique, which further relate to communications devices, methods of operating communications devices and infrastructure equipment, as well as circuitry for the same, can provide a hybrid, enhanced RACH procedure which can be used in NR wireless communications system where the resources required for the transmission of the first message in the presently known two-step RACH procedure may be optimised.

Respective aspects and features of the present disclosure are defined in the appended claims. It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
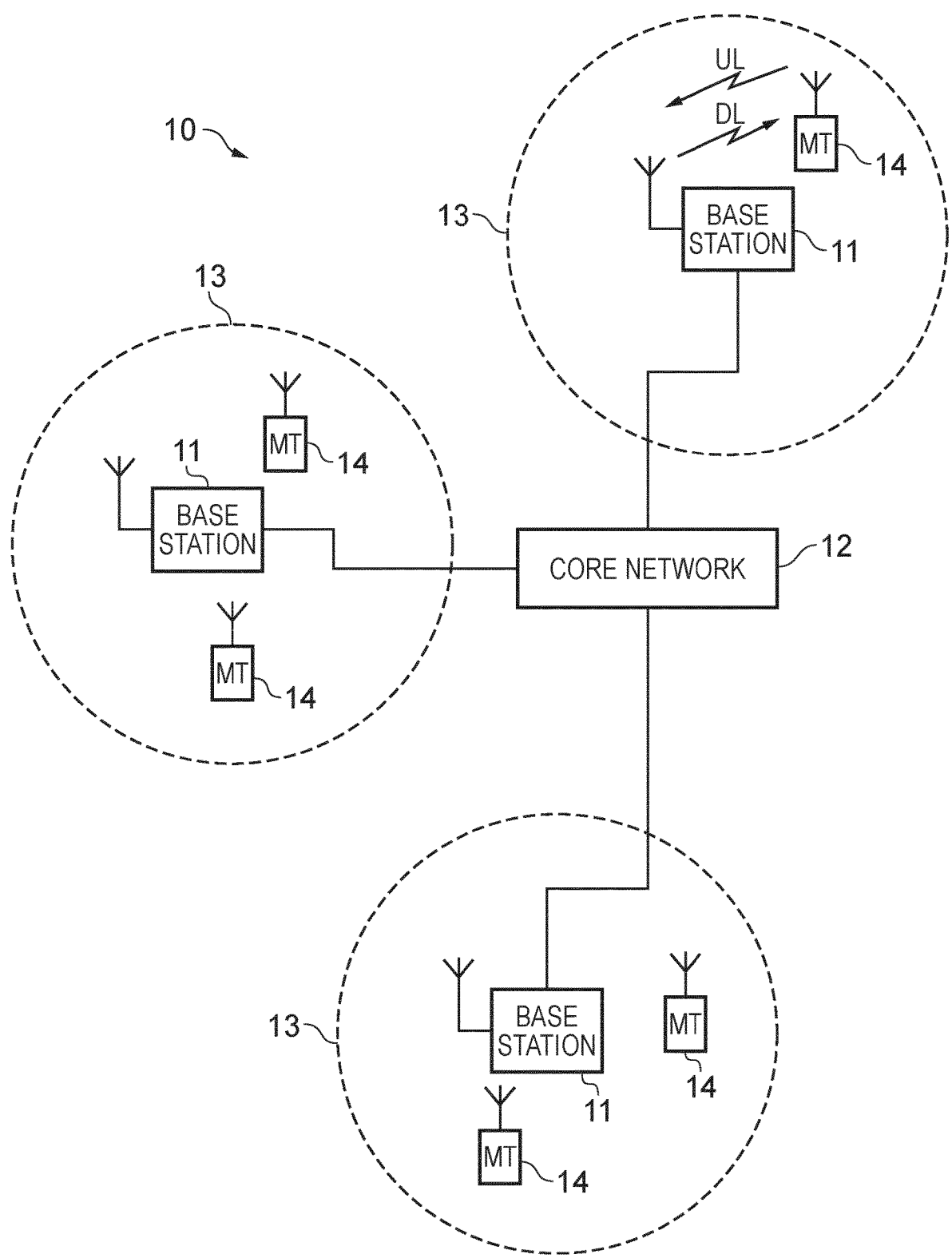
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [6]

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
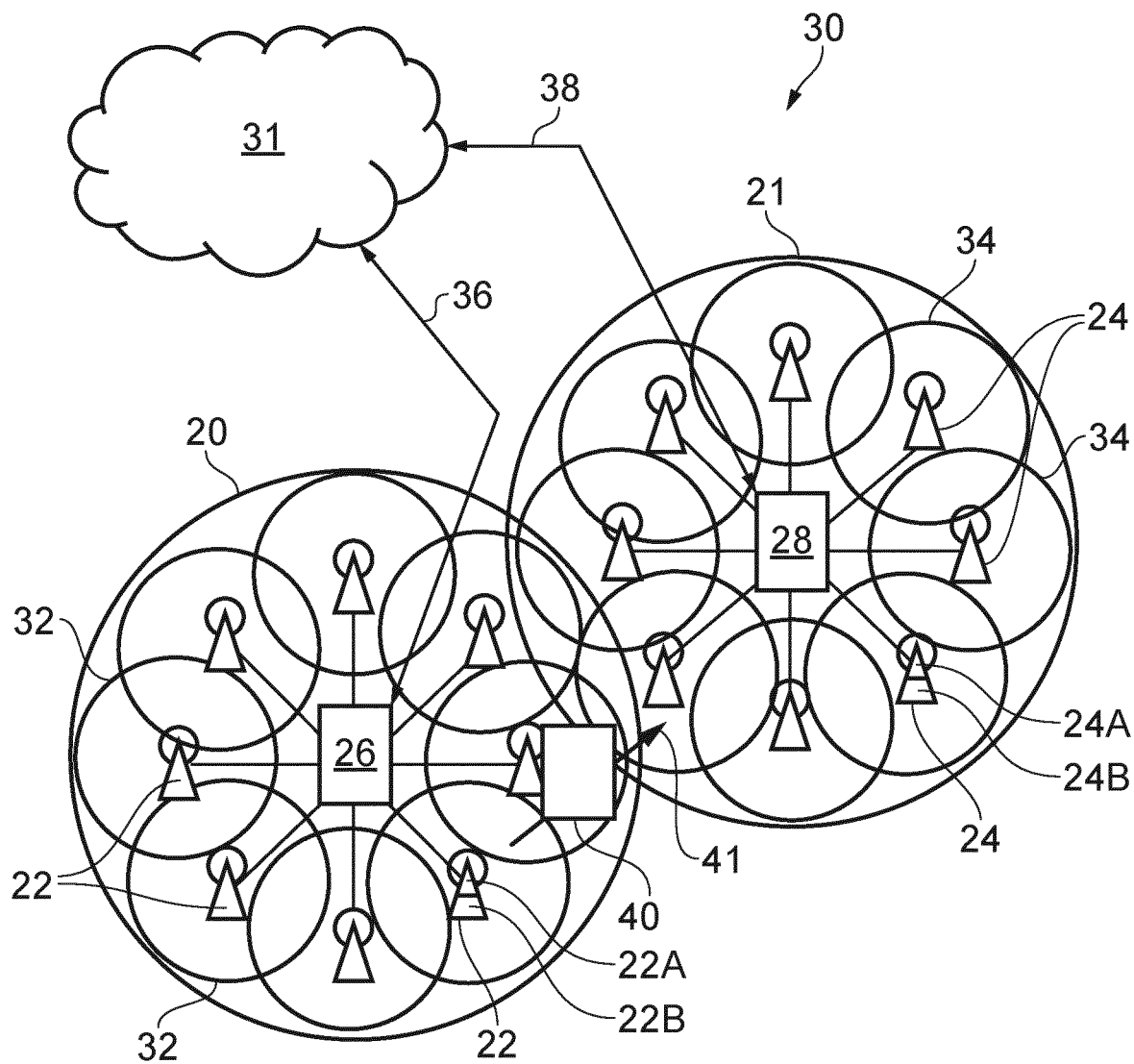
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, gNodeB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Current RACH Procedures in LTE

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order), see, for example, Section 5.3.3.1.3 in ETSI TS 136 213 V13.0.0 (2016-01)/3GPP TS 36.212 version 13.0.0 Release 13 [7].

There are various scenarios in which a network triggered RACH procedure (PDCCH order) may arise.

For example:

a terminal device may receive a PDCCH order to transmit on PRACH as part of a handover procedure;

a terminal device that is RRC connected to a base station but has not exchanged data with the base station for a relatively long time may receive a PDCCH order to cause the terminal device to transmit a PRACH preamble so that it can be re-synchronised to the network and allow the base station to correct timings for the terminal device;

a terminal device may receive a PDCCH order so that it can establish a different RRC configuration in the subsequent RACH procedure, this may apply, for example, for a narrowband IoT terminal device which is prevented from RRC reconfiguration in connected mode whereby sending the terminal device to idle mode through a PDCCH order allows the terminal device to be configured in the subsequent PRACH procedure, for example to configure the terminal device for a different coverage enhancement level (e.g. more or fewer repetitions).

For convenience, the term PDCCH order is used herein to refer to signalling transmitted by a base station to instruct a terminal device to initiate a PRACH procedure regardless of the cause. However, it will be appreciated such an instruction may in some cases be transmitted on other channels/in higher layers. For example, in respect of an intra-system handover procedure, what is referred to here as a PDCCH order may be an RRC Connection Reconfiguration instruction transmitted on a downlink shared channel/PDSCH.

When a PDCCH order is transmitted to a terminal device, the terminal device is assigned a PRACH preamble signature sequence to use for the subsequent PRACH procedure. This is different from a terminal device triggered PRACH procedure in which the terminal device selects a preamble from a predefined set and so could by coincidence select the same preamble as another terminal device performing a PRACH procedure at the same time, giving rise to potential contention. Consequently, for PRACH procedures initiated by a PDCCH order there is no contention with other terminal devices undertaking PRACH procedures at the same time because the PRACH preamble for the PDCCH ordered terminal device is scheduled by the network/base station.

Figure 3:
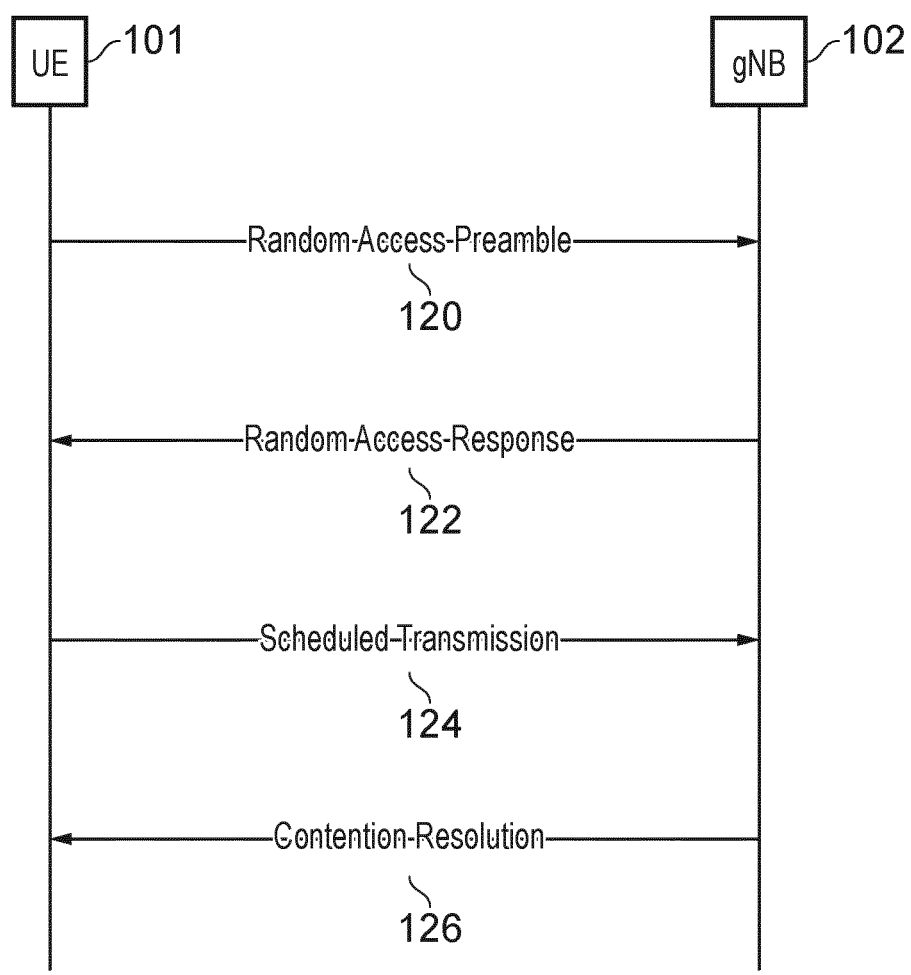
FIG. 3 is a schematic representation illustrating steps in a four-step random access procedure in a wireless telecommunications network.

FIG. 3 shows a typical RACH procedure used in LTE systems such as that described by reference to FIG. 1 which could also be applied to an NR wireless communications system such as that described by reference to FIG. 2. A UE 101, which could be in an inactive or idle mode, may have some data which it needs to send to the network. To do so, it sends a random access preamble 120 to a gNodeB 102. This random access preamble 120 indicates the identity of the UE 101 to the gNodeB 102, such that the gNodeB 102 can address the UE 101 during later stages of the RACH procedure. Assuming the random access preamble 120 is successfully received by the gNodeB 102 (and if not, the UE 101 will simply re-transmit it with a higher power), the gNodeB 102 will transmit a random access response 122 message to the UE 101 based on the identity indicated in the received random access preamble 120. The random access response 122 message carries a further identity which is assigned by the gNodeB 102 to identify the UE 101, as well as a timing advance value (such that the UE 101 can change its timing to compensate for the round trip delay caused by its distance from the gNodeB 102) and grant uplink resources for the UE 101 to transmit the data in. Following the reception of the random access response message 122, the UE 101 transmits the scheduled transmission of data 124 to the gNodeB 102, using the identity assigned to it in the random access response message 122. Assuming there are no collisions with other UEs, which may occur if another UE and the UE 101 send the same random access preamble 120 to the gNodeB 102 at the same time and using the same frequency resources, the scheduled transmission of data 124 is successfully received by the gNodeB 102. The gNodeB 102 will respond to the scheduled transmission 124 with a contention resolution message 126.

In various 3GPP RAN2 meetings, some agreements have been achieved on assumptions for how UE states (e.g. RRC_IDLE, RRC_CONNECTED etc.) may translate to NR systems. In RAN2 #94, it was agreed that a new "inactive" state should be introduced, where the UE should be able to start data transfer with a low delay (as required by RAN requirements). At the time of RAN2 #94, an issue concerning how data transmissions would work when UEs are in the inactive state were unresolved; it was agreed that it was for further study whether data transfer should achieved by leaving the inactive state or whether data transfer should occur from within the inactive state.

In RAN2 #95, it was agreed that the possibility of the UE being able to transmit data in the inactive state without transition to connected state will be studied.

In RAN2 #95bis, two approaches were identified as follows, in addition to a baseline move to the connected state before the transmission of data:

Data could be transmitted together with an initial RRC message requesting a transition to the connected state, or Data could be transmitted in a new state.

Figure 4:
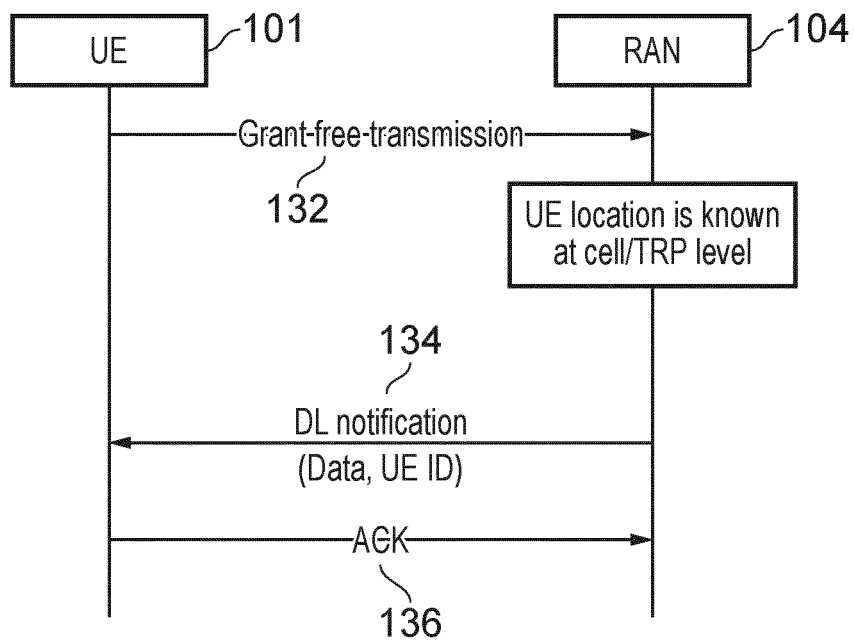
FIG. 4 is a schematic representation illustrating an example of uplink data transmission of a communications device in RRC_INACTIVE mode with a downlink response from the network.

Discussions relating to uplink data transmission in the inactive state have sought solutions for sending uplink data without RRC signalling in the inactive state and without the UE initiating a transition to the connected state. A first potential solution is discussed in 3GPP document R2-168544 titled "UL data transmission in RRC_INACTIVE" (Huawei) [8]. This solution is shown in FIG. 4, which is reproduced along with the accompanying text from [8]. As shown in FIG. 4, an uplink data transmission 132 can be made to a network 104 in the RRC_INACTIVE state by a UE 101. The network 104 here at least knows in which cell the transmission 132 was received, and potentially may even know via which TRP.

For a certain amount of time after receiving an uplink data packet, the network 104 could assume that the UE 101 is still in the same location, so that any RLC acknowledgement or application response could be scheduled for transmission to the UE 101 in the same area where the UE 101 is, for example in the next paging response 134. Alternatively, the UE 101 may be paged in a wider area. Following reception of this downlink response 134 the UE 101 may transmit an acknowledgement 136 to the network 104 to indicate that it was successfully received.

Figure 5:
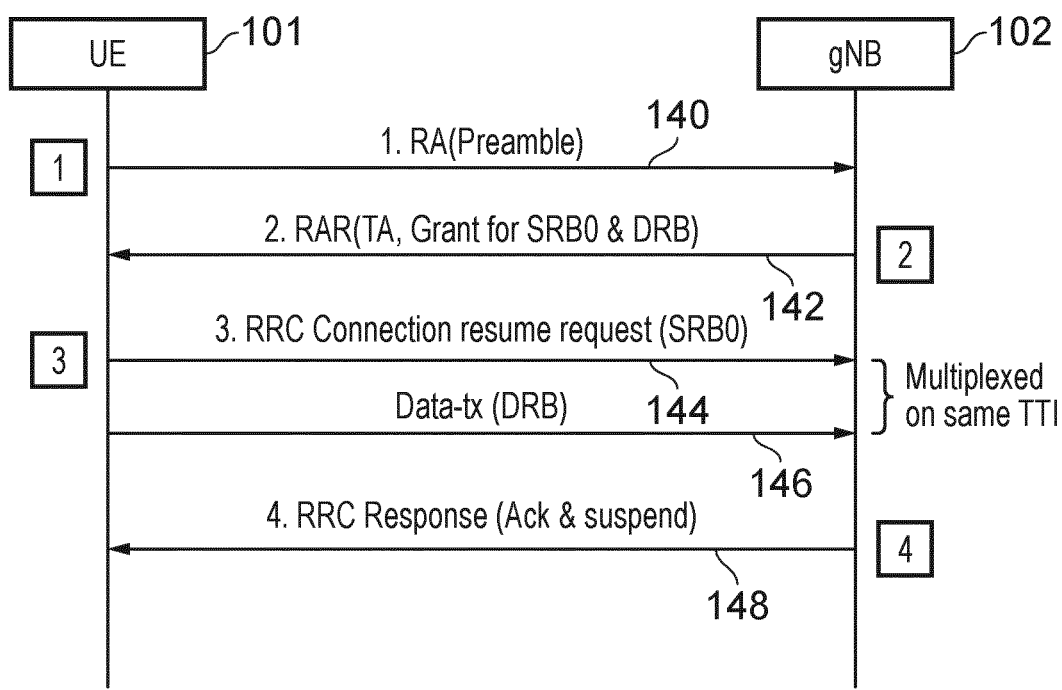
FIG. 5 is a schematic representation illustrating an example RACH procedure which could be applied for transmissions of small amounts of data.

A second potential solution is discussed in 3GPP document R2-168713 titled "Baseline solution for small data transmission in RRC_INACTIVE" (Ericsson) [9]. This solution is shown in FIG. 5, which is reproduced along with the accompanying text from [9]. The mechanism described in FIG. 5 is for small data transmissions and is based on the Suspend-Resume mechanism for LTE. The main difference is that User Plane data is transmitted simultaneously with message 3 (the RRC Connection resume request 144 in FIG. 5) and an optional RRC suspend signalled in message 4. As shown in FIG. 5, initially under the assumption of a random access scheme as in LTE, when a UE 101 receives uplink data to transmit to a gNodeB 102 of a mobile communications network, the UE 101 first transmits a random access (RA) preamble 140. Here a special set of preambles (a preamble partition) can be used as in LTE to indicate a small data transmission (meaning that the UE 101 wants a larger grant and possibly that the UE 101 wishes to remain in the inactive state).

The network (via the gNodeB 102) responds with a random access response (RAR) message 142 containing timing advance and a grant. The grant for message 3 should be large enough to fit both the RRC request and a small amount of data. The allowable size of the data could be specified and linked to the preambles, e.g. preamble X asks for a grant to allow Y bytes of data. Depending on available resources, the gNodeB 102 may supply a grant for message 3 accommodating only the resume request, in which case an additional grant could be supplied after reception of message 3.

At this point the UE 101 will prepare the RRC Connection Resume Request 144 and perform the following actions:

Re-establish Packet Data Convergence Protocol (PDCP) for SRBs and all DRBs that are established;
Re-establish RLC for signalling radio bearers (SRBs) and all data radio bearers (DRBs) that are established. The PDCP should reset sequence numbers (SN) and hyper frame numbers (HFN) during this step;
Resume SRBs and all DRBs that are suspended;
Derive a new security key (e.g. eNB key, or KeNB) possible based on next-hop chaining counters (NCC) provided before the UE 101 was sent to the "inactive" state;
Generate encryption and integrity protection keys and configure PDCP layers with previously configured security algorithm;
Generate RRC Connection Resume Request message 144;
An indication, e.g. a buffer status report (BSR), of potentially remaining data is added;
An indication that the UE 101 wishes to remain in the inactive state (if this is not indicated by the preamble) is added;
Apply the default physical channel and media access control (MAC) configuration; and
Submit RRC Connection Resume Request 144 and data 146 to lower layers for transmission.

After these steps, the lower layers transmit Message 3. This can also contain User Plane data 146 multiplexed by MAC, like existing LTE specifications as security context is already activated to encrypt the User Plane. The signalling (using SRB) and data (using DRB will be multiplexed by MAC layer (meaning the data is not sent on the SRB).

The network (via the gNodeB 102) receives Message 3 and uses the context identifier to retrieve the UE's 101 RRC context and re-establish the PDCP and RLC for the SRBs and DRBs. The RRC context contains the encryption key and the User Plane data is decrypted (will be mapped to the DRB that is re-established or to an always available contention based channel).

Upon successful reception of Message 3 and User Plane data, the network (via the gNodeB 102) responds with a new RRC response message 148 which could either be an "RRC suspend" or an "RRC resume" or an "RRC reject". This transmission resolves contention and acts as an acknowledgement of Message 3. In addition to RRC signalling the network can in the same transmission acknowledge any user data (RLC acknowledgements). Multiplexing of RRC signalling and User Plane acknowledgements will be handled by the MAC layer. If the UE 101 loses the contention then a new attempt is needed.

In case the network decides to resume the UE 101, the message will be similar to a RRC resume and may include additional RRC parameters.
In case the network decides to immediately suspend the UE 101, the message will be similar to a RRC suspend. This message can possibly be delayed to allow downlink acknowledgements to be transmitted.
In case the network sends a resume reject the UE 101 will initiate a new scheduling request (SR) as in LTE, after some potential backoff time.

This procedure will, strictly speaking, transmit the User Plane data without the UE 101 fully entering RRC_CONNECTED, which formerly would happen when the UE 101 receives the RRC Response (Message 4) indicating resume. On the other hand, it uses the RRC context to enable encryption etc. even if the network's decision is to make the UE 101 remain in RRC_INACTIVE by immediately suspending the UE 101 again.

Figure 6:
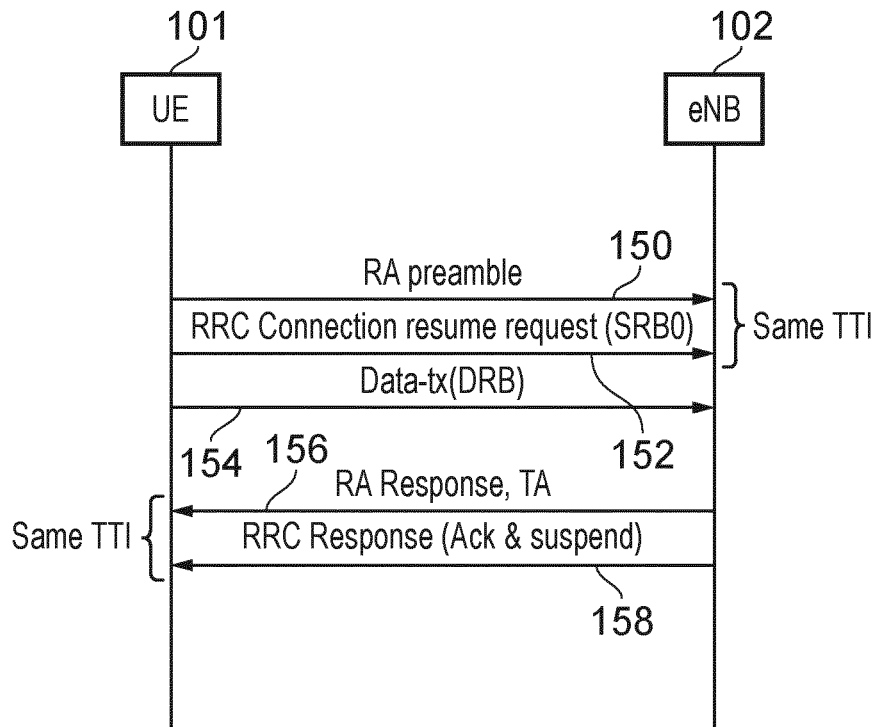
FIG. 6 is a schematic representation illustrating an example two-step RACH procedure which could be applied for transmissions of small amounts of data.
Figure 7:
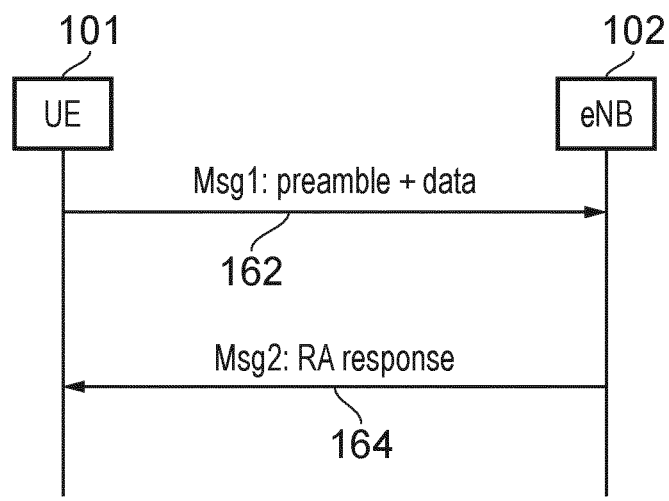
FIG. 7 is a schematic representation illustrating steps in a two-step random access procedure in a wireless telecommunications network.

FIGS. 6 and 7 each show examples of a simplified two-step RACH procedure, in which small amounts of data can be transmitted by a UE 101 to an gNodeB or eNodeB 102. In the two-step RACH procedure, the data is transmitted at the same time as the RACH preamble (message 162 in FIG. 7), and so there is no need for the UE 101 to wait for a response from the network providing it with an uplink grant to transmit its data. However, the downside is that a limited amount of data can be transmitted in message 1. Following the reception of message 1 at the eNodeB 102, the eNodeB 101 transmits a random access response (message 162 in FIG. 7) to the UE 101, which comprises an acknowledgement of the received data in message 1. FIG. 6 shows the messages in a little more detail, where in message 1 (also termed herein msgA), the random access preamble 150, RRC connection resume request 152 and the small amount of data 154 are transmitted during the same transmission time interval (TTI). This message msgA is essentially a combination of Message 1 and Message 3 in the 4-step RACH procedure as shown for example in FIG. 5. Likewise, for message 2 (also termed herein msgB), the random access response with timing advance 156 and the RRC response 158 (comprising an acknowledgement and RRC suspend command) are transmitted by the eNodeB 102 to the UE 101 during the same TTL This message msgB is essentially a combination of Message 2 and Message 4 in the 4-step RACH procedure as shown for example in FIG. 5. Further details relating to the two-step and four-step RACH procedures can be found in the 3GPP Technical Report 38.889 [10].

Embodiments of the present technique aim to provide a solution to optimise the four step RACH, for example the LTE RACH procedure shown in FIG. 3, and the two step RACH, such as that shown in FIGS. 6 and 7, in order to address medium to large data transmissions, where there is less delay and no requirement for communications devices to leave the inactive state.

Location Based 2-Step RACH Procedure

Embodiments of the present technique provide systems and methods which seek to optimise the resources of data transmission in msgA, as the UEs' locations within the cell, and present RRC state, are different. This means that the design and allocation of resources for data transmissions (PUSCH) should not be based on only a UE at the cell edge or a UE experiencing the worst channel conditions, probably for the largest cell size, as this would lead to inefficiencies in resource allocation for all UEs but those in the most remote locations in the biggest cells and experiencing the worst channel conditions. It is thus proposed by embodiments of the present disclosure that parameters such as the resources for the transmission of data (i.e. the "message 3" portion of the new msgA in the two-step RACH process) and the modulation and coding scheme (MCS) and/or transmission power with which the uplink data of msgA is transmitted should be adaptive based on how far the UE is from the infrastructure equipment operating the cell, and/or on the UE's channel conditions.

Figure 8:
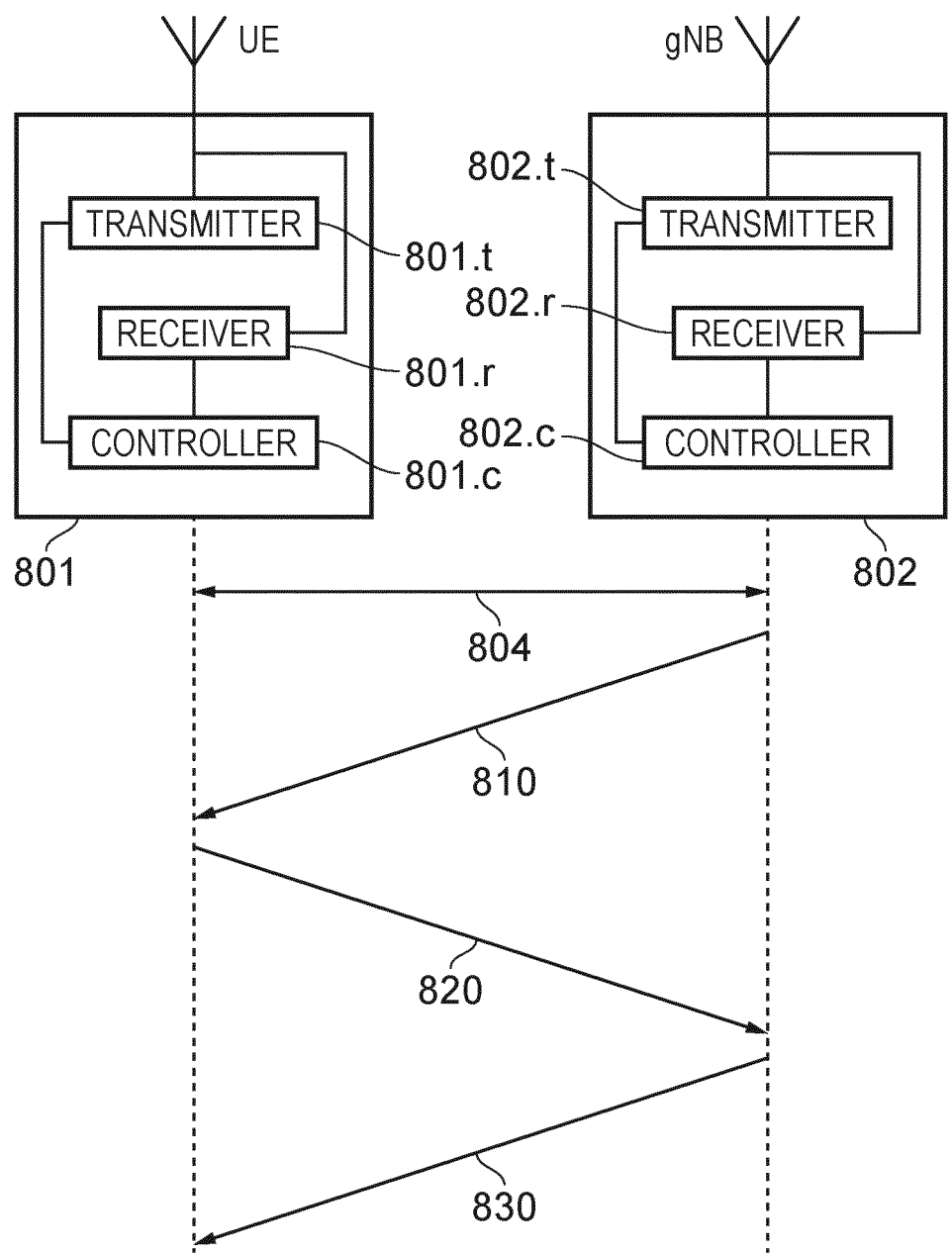
FIG. 8 is a part schematic representation, part message flow diagram of communications between a communications device and an infrastructure equipment of a wireless communications network in accordance with embodiments of the present technique.

FIG. 8 provides a part schematic representation, part message flow diagram of communications between a communications device or UE 801 and an infrastructure equipment or gNodeB 802 of a wireless communications network in accordance with embodiments of the present technique. The infrastructure equipment 802 provides a cell having a coverage area within which the communications device 801 is located. The communications device 801 comprises a transmitter (or transmitter circuitry) 801.*t* configured to transmit signals to the infrastructure equipment 802 via a wireless access interface 804 provided by the wireless communications network, a receiver (or receiver circuitry) 801.*r* configured to receive signals from the infrastructure equipment 802 via the wireless access interface 804, and a controller (or controller circuitry) 801.*c* configured to control the transmitter circuitry 801.*t* and the receiver circuitry 801.*r* to transmit or to receive the signals. As can be seen in FIG. 8, the infrastructure equipment 802 also comprises a transmitter (or transmitter circuitry) 802.*t* configured to transmit signals to the communications device 801 (which may be one of a plurality of communications devices) via the wireless access interface 804, a receiver (or receiver circuitry) 802.*r* configured to receive signals from the communications device 801 via the wireless access interface 804, and a controller (or controller circuitry) 802.*c* configured to control the transmitter circuitry 802.*t* and the receiver circuitry 802.*r* to transmit or to receive the signals representing data. Each of the controllers 801.*c*, 802.*c* may be, for example, a microprocessor, a CPU, or a dedicated chipset, etc.

The controller circuitry 802.*c* of the infrastructure equipment 802 is configured in combination with the receiver circuitry 802.*r* and the transmitter circuitry 802.*t* of the infrastructure equipment 802 to transmit 810 to the communications device 801 (or to the plurality of communications devices) an indication of one or more of a plurality of uplink data transmission configurations, the uplink data transmission configurations each defining different values of a set of one or more communications parameters in accordance with which the communications device 801 (or the plurality of communications devices) is to transmit uplink data to the infrastructure equipment 802, to receive 820 a first signal comprising a random access preamble and uplink data from the communications device 801 (which may be one of the plurality of communications devices), and to transmit 830 a random access response message (e.g. as a part of a msgB as defined herein, also comprising contention resolution) to the communications device 801 (which may be one of the plurality of communications devices. The one of the plurality of uplink data transmission configurations defining the values of the communications parameters in accordance with which the uplink data of the first signal is received by the infrastructure equipment 802 is dependent on a distance between the communications device 801 (which may be one of the plurality communications devices) and the infrastructure equipment 802.

Equally, the controller circuitry 801.*c* of the communications device 801 is configured in combination with the receiver circuitry 801.*r* and the transmitter circuitry 801.*t* of the communications device 801 to receive from the infrastructure equipment 802 an indication of one or more of a plurality of uplink data transmission configurations, the uplink data transmission configurations each defining different values of a set of one or more communications parameters in accordance with which the communications device 801 is to transmit uplink data to the infrastructure equipment 802, to determine that one of the indicated uplink data transmission configurations should be used to transmit uplink data to the infrastructure equipment 802 dependent on distance between the communications device 801 and the infrastructure equipment 802, to transmit a first signal comprising a random access preamble and uplink data to the infrastructure equipment 802 in accordance with values of the parameters defined by the determined uplink data transmission configuration, and to receive a random access response message from the infrastructure equipment 802.

Essentially, embodiments of the present technique propose a location based PUSCH configuration in order to support optimised payload transmission in msgA of the 2-step RACH procedure. Based on the UE's location information, and depending on the UE's current RRC state, different signalling schemes are proposed herein to notify the UE of the PUSCH configurations. As described in Table I below, these PUSCH configurations may be partitioned based on the distance between the UE and base station (gNodeB):

TABLE I

PUSCH configuration based on location information

| PUSCH configuration | Parameters/values | UE-gNodeB Distance |
| --- | --- | --- |
| PUSCH Config 1 | Time-Frequency resources set 1, MCS1, transmit power 1, etc. | 0-50 meters |
| PUSCH Config 2 | Time-Frequency resources set 2, MCS2, transmit power 2, etc. | 50-100 meters |
| PUSCH Config 3 | Time-Frequency resources set 3, MCS3, transmit power 3, etc. | 100-200 meters |

In other words, the one or more communications parameters may comprise communications resources of the wireless access interface in which the uplink data of the first signal is to be transmitted by the plurality of communications devices. Here, the uplink data may be received by the infrastructure equipment from the one of the communications devices in a set of communications resources of the wireless access interface defined by one of the plurality of uplink data transmission configurations, wherein the random access preamble is associated with the set of communications resources. Alternatively, or in addition, the one or more communications parameters may comprise a modulation and coding scheme with which the uplink data of the first signal is to be transmitted by the plurality of communications devices. Alternatively, or in addition, the one or more communications parameters comprise a transmission power with which the uplink data of the first signal is to be transmitted by the plurality of communications devices.

Although the above Table I shows three PUSCH configurations, with three parameters/values shown, and dependent on specific distances between the UE and gNodeB, those skilled in the art would appreciate that embodiments of the present technique encompass any minor alterations to what is shown in Table I. For example, there may be more than or fewer than three PUSCH configurations, and more than or fewer than three parameters/values per configuration. Some configurations may have more or fewer parameters than others, and some parameter values may be the same among more than one of the configurations (for example, PUSCH Config 2 and PUSCH Config 3 may both indicate that the UE should use transmit power 3 when transmitting uplink data to the gNodeB). Furthermore, the UE-gNodeB distance threshold ranges may be modified to any suitable values/ranges.

As mentioned above, signalling of the uplink data transmission configurations may vary dependent on the present RRC state of the UE to which these configurations are indicated. Such signalling, and such corresponding UE behaviour, is described below in sections each relating to UEs in a different RRC state. However, those skilled in the art would appreciate that the described signalling techniques and UE behaviour described by way of a UE in one particular RRC state could apply equally to UEs in a different RRC state. For example, the configurations could be broadcast to any UEs which may be able to receive them, and not just to RRC_IDLE UEs; equally, RRC_INACTIVE UEs may not receive the indication of the configurations solely through an RRC release message.

RRC_IDLE UEs

If an RRC_IDLE UE has positioning capability and has good knowledge of the base station's position, it is able to calculate how far it is away from the base station. Then, based on the distance information, the UE is able to select the appropriate PUSCH configuration to initiate the 2-step RACH. In other words, the communications device is configured to determine the distance between the communications device and the infrastructure equipment by performing a calculation based on a location of the communications device with respect to a location of the infrastructure equipment.

As described in further detail below, the PUSCH configuration and gNodeB location information could be broadcast in system information or pre-defined and known to the UE.

RRC_INACTIVE UEs

If there is a possibility for the base station to be aware of the UE's location, the UE could be configured with a PUSCH configuration that contains power, MCS, and Timing Advance values that matches the distance of the UE to the base station. The configuration could be a suggested (and dedicated) PUSCH configuration for this specific UE or a series of candidate PUSCH configuration, as for RRC_IDLE UEs. In other words, the infrastructure equipment is configured to transmit an indication of a suggested one of the plurality of uplink data transmission configurations to one or more of the plurality of communications devices as part of a radio resource control, RRC, release message indicating that a communications link between the one or more of the communications devices and the infrastructure equipment should either be released or suspended, the suggested one of the plurality of the uplink data transmission configurations being selected for each of the one or more of the plurality of communications devices by the infrastructure equipment based on a most recently known location of the each of the one or more of the plurality of communications devices. The communications device is configured to transmit the first signal to the infrastructure equipment in accordance with values of the parameters defined by the suggested one of the plurality of uplink data transmission configurations.

The base station will contain the suggested PUSCH configuration to be used for 2-step RACH msgA transmission in RRC release message when transit UE to RRC_INACTIVE state, based on the latest UE location information. When UE performs 2-step RACH, UE will consider adopting this configuration with the condition that UE's position doesn't change much, for example, within a threshold (e.g. a distance in meters or a RSRP threshold) and this threshold could be signalled together with the PUSCH configuration. If the UE moves beyond the threshold, it's up to the UE to decide the PUSCH configuration based on the suggested configuration. In other words, the RRC release message comprises an indication of a boundary within which a parameter of the one or more of the communications devices must remain for the suggested uplink data transmission configuration to remain valid for defining how the one or more of the communications devices should transmit uplink data to the infrastructure equipment. Here, the parameter of the one or more of the communications devices may be the distance between the one or more of the communications devices and the infrastructure equipment. Alternatively, or in addition, the parameter of the one or more of the communications devices may be a reference signal received power, RSRP, of signals received by the one or more of the communications devices from the infrastructure equipment.

In some arrangements of embodiments of the present technique, there may also be a validity timer defining for how long the configuration is valid. Additionally, the validity of the configuration may also depend on the mobility; for example, that in case the UE would also be able to obtain positioning information, absolute or relative, by measuring movements, this could indicate whether the PUSCH configuration would still be valid, or whether the UE should fall back to a normal 2-step/4-step RACH behaviour. For example the simplest case would be a stationary UE; here the UE then could keep and use a PUSCH configuration for a long time. In other words, the RRC release message comprises an indication of a validity timer defining a period for which the suggested uplink data transmission configuration remains valid for defining how the one or more of the communications devices should transmit uplink data to the infrastructure equipment.

RRC_CONNECTED UEs

RAN3 is currently studying RAN-centric data collection, and a RAN node will collect data for a particular UE based on measurement reports, measurements performed at the base station and different configurations provided by the base station and UE in response to these configurations (features). It is assumed that based on these measurements or data collection at the base station, the RAN node will have sufficient information about a UE's mobility, velocity, location etc. If the UE, during handover (HO) procedure, is configured to perform contention based random access procedure with the target cell, then the above information about the UE's position might be useful in optimising the PUSCH resource allocation if 2-step RACH is configured.

In the RRC_CONNECTED state, if the base station is aware of the UE's position (see above), and/or by performing the above technique(s) related to RAN centric data collection, this could support the base station on the handover procedure. Benefits of this would be that, based on collected data and the knowledge of the exact UE position, a suitable PUSCH configuration could be provided in the handover command message (RRC reconfiguration message).

The UE performs a RACH procedure as the first procedure with the target node during HO, and so any such information must be provided by either the source node or a centralised server, which the target node is able access before the UE initiates the 2 step RACH procedure. So, if the UE performs the 2-step RACH procedure whereby the first message (msgA) includes a random access preamble and message 3 (or actual uplink data) then a PUSCH resource allocation can be provided in the HO Command to the UE after the above described coordination between the source node and the target node (including via a centralised server) has taken place.

The actual impacts will involve a HO Request message being sent by the source node to the target node including detailed UE data. The target node takes this information into account and provides a suggested PUSCH configuration in its HO Response including the HO Command message, which in turn includes an RRC Reconfiguration message with synchronisation. The PUSCH configuration, as described above, may include the MCS configuration and the MCS can be adjusted based on the UE's location, whilst avoiding setting the PUSCH value to an extreme value always considering the cell edge case. In other words, the infrastructure equipment is configured to transmit an indication of a suggested one of the plurality of uplink data transmission configurations to one or more of the plurality of communications devices as part of an RRC connection reconfiguration message indicating that a communications link between the one or more of the communications devices and the infrastructure equipment should be modified, the suggested one of the plurality of the uplink data transmission configurations being selected for each of the one or more of the plurality of communications devices by the infrastructure equipment based on a most recently known location of the each of the one or more of the plurality of communications devices. The communications device is configured to transmit the first signal to the infrastructure equipment in accordance with values of the parameters defined by the suggested one of the plurality of uplink data transmission configurations.

Such a method as described above allows the possibility of a PUSCH resource configuration which is common to all UEs in a cell, as well as a dedicated PUSCH configuration for a particular UE. Such dedicated configurations can also be used during handover while performing a RACH procedure using the 2-step RACH process on a target cell where the UE did not have any opportunity to communicate before the RACH procedure was triggered.

Signalling of Uplink Data Transmission Configurations

Figure 9:
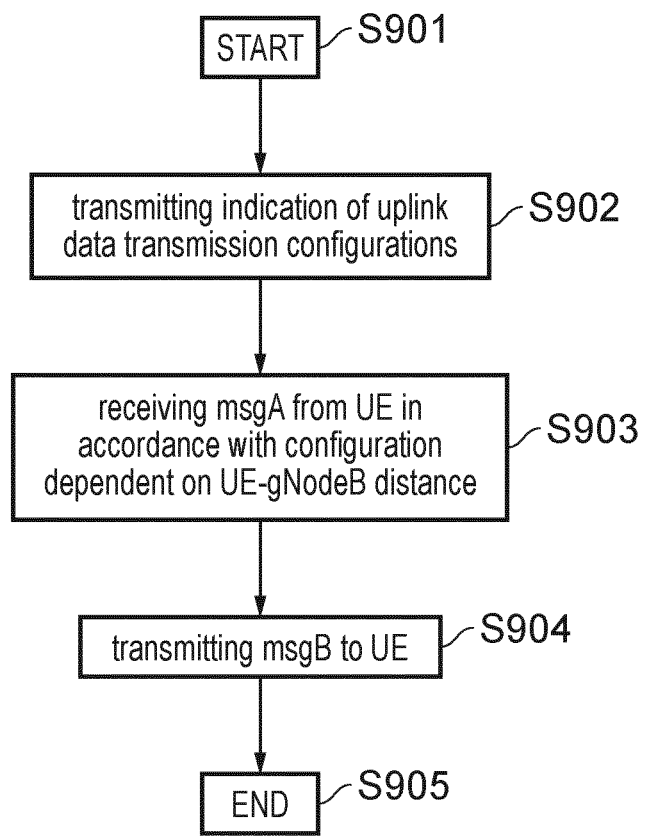
FIG. 9 shows a flow diagram illustrating a process of communications between a communications device and an infrastructure equipment in accordance with embodiments of the present technique.

It should be appreciated by those skilled in the art that any information at or determined by the gNodeB described herein by way of description of the embodiments of the present technique, and arrangements, in relation to FIGS. 8 and 9 or otherwise, may be signalled to the UE in different ways. Such information includes the (one or more of the) plurality of the uplink data transmission configurations and the communications parameters defined by these (i.e. the sets of communications time/frequency resources of the wireless access interface, MCS levels, transmission powers, etc.) and in some arrangements the location of the infrastructure equipment. The indication of the uplink data transmission configurations may be signalled directly by the infrastructure equipment to the plurality of communications devices. Alternatively, the indication of uplink data transmission configurations may be broadcast by the infrastructure equipment to be receivable by the plurality of communications devices. The values of the one or more communications parameters (defined by the uplink data transmission configurations) may be signalled in at least one system information block. Alternatively, the values of the one or more communications parameters (defined by the uplink data transmission configurations) may be fixed and predefined (for example they may form some sort of table known by or transmitted to the UE).

Flow Diagram Representation

FIG. 9 shows a flow diagram illustrating method of operating a communications device for transmitting data to an infrastructure equipment of a wireless communications network, the infrastructure equipment providing a cell having a coverage area in which the communications device is located. The method begins in step S901. The method comprises, in step S902, transmitting, to the plurality of communications devices via a wireless access interface provided by the wireless communications network, an indication of one or more of a plurality of uplink data transmission configurations, the uplink data transmission configurations each defining different values of a set of one or more communications parameters in accordance with which the plurality of communications devices are to transmit uplink data to the infrastructure equipment. The method then comprises in step S903, receiving, via the wireless access interface, a first signal comprising a random access preamble and uplink data from one of the communications devices. Here, the one of the plurality of uplink data transmission configurations defining the values of the communications parameters in accordance with which the uplink data of the first signal is received by the infrastructure equipment is dependent on a distance between the one of the communications devices and the infrastructure equipment. In step S904, the process comprises transmitting, via the wireless access interface a random access response message to the one of the communications devices. The process ends in step S905.

Those skilled in the art would appreciate that the method shown by FIG. 9 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. An infrastructure equipment forming part of a wireless communications network for transmitting data to or receiving data from a plurality of communications devices, the infrastructure equipment providing a cell having a coverage area in which the plurality of communications devices are located, the infrastructure equipment comprising
  transmitter circuitry configured to transmit signals to the communications devices via a wireless access interface provided by the wireless communications network,
  receiver circuitry configured to receive signals from the communications devices via the wireless access interface, and
  controller circuitry configured in combination with the receiver circuitry and the transmitter circuitry
  to transmit to the plurality of communications devices an indication of one or more of a plurality of uplink data transmission configurations, the uplink data transmission configurations each defining different values of a set of one or more communications parameters in accordance with which the plurality of communications devices are to transmit uplink data to the infrastructure equipment,
  to receive a first signal comprising a random access preamble and uplink data from one of the communications devices, and
  to transmit a random access response message to the one of the communications devices,
  wherein the one or more of the plurality of uplink data transmission configurations defining the values of the communications parameters in accordance with which the uplink data of the first signal is received by the infrastructure equipment is dependent on a distance between the one of the communications devices and the infrastructure equipment.

Paragraph 2. An infrastructure equipment according to Paragraph 1, wherein the one or more communications parameters comprise communications resources of the wireless access interface in which the uplink data of the first signal is to be transmitted by the plurality of communications devices.

Paragraph 3. An infrastructure equipment according to Paragraph 2, wherein the uplink data is received from the one of the communications devices in a set of communications resources of the wireless access interface defined by one of the plurality of uplink data transmission configurations, wherein the random access preamble is associated with the set of communications resources.

Paragraph 4. An infrastructure equipment according to any of Paragraphs 1 to 3, wherein the one or more communications parameters comprise a modulation and coding scheme with which the uplink data of the first signal is to be transmitted by the plurality of communications devices.

Paragraph 5. An infrastructure equipment according to any of Paragraphs 1 to 4, wherein the one or more communications parameters comprise a transmission power with which the uplink data of the first signal is to be transmitted by the plurality of communications devices.

Paragraph 6. An infrastructure equipment according to any of Paragraphs 1 to 5, wherein the controller is configured in combination with the transmitter to broadcast the indication of all of the plurality of uplink data transmission configurations to be receivable by one or more of the plurality of communications devices.

Paragraph 7. An infrastructure equipment according to any of Paragraphs 1 to 6, wherein the controller is configured in combination with the transmitter to signal the indication of all of the plurality of uplink data transmission configurations directly to one or more of the plurality of communications devices.

Paragraph 8. An infrastructure equipment according to any of Paragraphs 1 to 7, wherein the indication of the one or more of the plurality of uplink data transmission configurations are signalled in at least one system information block.

Paragraph 9. An infrastructure equipment according to any of Paragraphs 1 to 8, wherein the indication of the one or more of the plurality of uplink data transmission configurations are fixed and predefined.

Paragraph 10. An infrastructure equipment according to any of Paragraphs 1 to 9, wherein the controller is configured in combination with the transmitter to transmit an indication of a suggested one of the plurality of uplink data transmission configurations to one or more of the plurality of communications devices as part of a radio resource control, RRC, release message indicating that a communications link between the one or more of the communications devices and the infrastructure equipment should either be released or suspended, the suggested one of the plurality of the uplink data transmission configurations being selected for each of the one or more of the plurality of communications devices by the infrastructure equipment based on a most recently known location of the each of the one or more of the plurality of communications devices.

Paragraph 11. An infrastructure equipment according to Paragraph 10, wherein the RRC release message comprises an indication of a validity timer defining a period for which the suggested uplink data transmission configuration remains valid for defining how the one or more of the communications devices should transmit uplink data to the infrastructure equipment.

Paragraph 12. An infrastructure equipment according to Paragraph 10 or Paragraph 11, wherein the RRC release message comprises an indication of a boundary within which a parameter of the one or more of the communications devices must remain for the suggested uplink data transmission configuration to remain valid for defining how the one or more of the communications devices should transmit uplink data to the infrastructure equipment.

Paragraph 13. An infrastructure equipment according to Paragraph 12, wherein the parameter of the one or more of the communications devices is the distance between the one or more of the communications devices and the infrastructure equipment.

Paragraph 14. An infrastructure equipment according to Paragraph 12 or Paragraph 13, wherein the parameter of the one or more of the communications devices is a reference signal received power, RSRP, of signals received by the one or more of the communications devices from the infrastructure equipment.

Paragraph 15. An infrastructure equipment according to any of Paragraphs 1 to 14, wherein the controller is configured in combination with the transmitter to transmit an indication of a suggested one of the plurality of uplink data transmission configurations to one or more of the plurality of communications devices as part of an RRC connection reconfiguration message indicating that a communications link between the one or more of the communications devices and the infrastructure equipment should be modified, the suggested one of the plurality of the uplink data transmission configurations being selected for each of the one or more of the plurality of communications devices by the infrastructure equipment based on a most recently known location of the each of the one or more of the plurality of communications devices.

Paragraph 16. A method of operating an infrastructure equipment forming part of a wireless communications network for transmitting data to or receiving data from a plurality of communications devices, the infrastructure equipment providing a cell having a coverage area in which the plurality of communications devices are located, the method comprising
　　transmitting, to the plurality of communications devices via a wireless access interface provided by the wireless communications network, an indication of one or more of a plurality of uplink data transmission configurations, the uplink data transmission configurations each defining different values of a set of one or more communications parameters in accordance with which the plurality of communications devices are to transmit uplink data to the infrastructure equipment,
　　receiving, via the wireless access interface, a first signal comprising a random access preamble and uplink data from one of the communications devices, and
　　transmitting, via the wireless access interface a random access response message to the one of the communications devices,
　　wherein the one or more of the plurality of uplink data transmission configurations defining the values of the communications parameters in accordance with which the uplink data of the first signal is received by the infrastructure equipment is dependent on a distance between the one of the communications devices and the infrastructure equipment.

Paragraph 17. Circuitry for an infrastructure equipment forming part of a wireless communications network for transmitting data to or receiving data from a plurality of communications devices, the infrastructure equipment providing a cell having a coverage area in which the plurality of communications devices are located, the infrastructure equipment comprising
　　transmitter circuitry configured to transmit signals to the communications devices via a wireless access interface provided by the wireless communications network,
　　receiver circuitry configured to receive signals from the communications devices via the wireless access interface, and
　　controller circuitry configured in combination with the receiver circuitry and the transmitter circuitry
　　to transmit to the plurality of communications devices an indication of one or more of a plurality of uplink data transmission configurations, the uplink data transmission configurations each defining different values of a set of one or more communications parameters in accordance with which the plurality of communications devices are to transmit uplink data to the infrastructure equipment,
　　to receive a first signal comprising a random access preamble and uplink data from one of the communications devices, and
　　to transmit a random access response message to the one of the communications devices,
　　wherein the one or more of the plurality of uplink data transmission configurations defining the values of the communications parameters in accordance with which the uplink data of the first signal is received by the infrastructure equipment is dependent on a distance between the one of the communications devices and the infrastructure equipment.

Paragraph 18. A communications device for transmitting data to or receiving data from an infrastructure equipment forming part of a wireless communications network, the infrastructure equipment providing a cell having a coverage area in which the communications devices is located, the communications device comprising
　　transmitter circuitry configured to transmit signals to the infrastructure equipment via a wireless access interface provided by the wireless communications network,
　　receiver circuitry configured to receive signals from the infrastructure equipment via the wireless access interface, and
　　controller circuitry configured in combination with the receiver circuitry and the transmitter circuitry
　　to determine a distance between the communications device and the infrastructure equipment,
　　to receive from the infrastructure equipment an indication of one or more of a plurality of uplink data transmission configurations, the uplink data transmission configurations each defining different values of a set of one or more communications parameters in accordance with which the communications device is to transmit uplink data to the infrastructure equipment,
　　to determine that one of the indicated uplink data transmission configurations should be used to transmit uplink data to the infrastructure equipment dependent on distance between the communications device and the infrastructure equipment,
　　to transmit a first signal comprising a random access preamble and uplink data to the infrastructure equipment in accordance with values of the parameters defined by the determined uplink data transmission configuration, and
　　to receive a random access response message from the infrastructure equipment.

Paragraph 19. A communications device according to Paragraph 18, wherein the one or more communications parameters comprise communications resources of the wireless access interface in which the uplink data of the first signal is to be transmitted by the communications device.

Paragraph 20. A communications device according to Paragraph 19, wherein the controller and the transmitter are configured in combination to transmit the uplink data to the infrastructure equipment in a set of communications resources of the wireless access interface defined by one of the plurality of uplink data transmission configurations, wherein the random access preamble is associated with the set of communications resources.

Paragraph 21. A communications device according to any of Paragraphs 18 to 20, wherein the one or more communications parameters comprise a modulation and coding scheme with which the uplink data of the first signal is to be transmitted by the communications device.

Paragraph 22. A communications device according to any of Paragraphs 18 to 21, wherein the one or more communications parameters comprise a transmission power with which the uplink data of the first signal is to be transmitted by the communications device.

Paragraph 23. A communications device according to any of Paragraphs 18 to 22, wherein the controller is configured in combination with the receiver to receive the indication of all of the plurality of uplink data transmission configurations via a broadcast from the infrastructure equipment.

Paragraph 24. A communications device according to any of Paragraphs 18 to 23, wherein the controller is configured in combination with the receiver to receive the indication of all of the plurality of uplink data transmission configurations via dedicated signalling from the infrastructure equipment.

Paragraph 25. A communications device according to any of Paragraphs 18 to 24, wherein the indication of the one or more of the plurality of uplink data transmission configurations are signalled in at least one system information block.

Paragraph 26. A communications device according to any of Paragraphs 18 to 25, wherein the indication of the one or more of the plurality of uplink data transmission configurations are fixed and predefined.

Paragraph 27. A communications device according to any of Paragraphs 18 to 26, wherein the communications device is configured to determine the distance between the communications device and the infrastructure equipment by performing a calculation based on a location of the communications device with respect to a location of the infrastructure equipment.

Paragraph 28. A communications device according to any of Paragraphs 18 to 27, wherein the controller is configured in combination with the receiver to receive an indication of a suggested one of the plurality of uplink data transmission configurations from the infrastructure equipment as part of a radio resource control, RRC, release message indicating that a communications link between the communications device and the infrastructure equipment should either be released or suspended, the suggested one of the plurality of the uplink data transmission configurations being selected for the communications device by the infrastructure equipment based on a most recently known location of the communications device.

Paragraph 29. A communications device according to Paragraph 28, wherein the RRC release message comprises an indication of a validity timer defining a period for which the suggested uplink data transmission configuration remains valid for defining how the communications device should transmit uplink data to the infrastructure equipment.

Paragraph 30. A communications device according to Paragraph 28 or Paragraph 29, wherein the RRC release message comprises an indication of a boundary within which a parameter of the communications device must remain for the suggested uplink data transmission configuration to remain valid for defining how the communications device should transmit uplink data to the infrastructure equipment.

Paragraph 31. A communications device according to Paragraph 30, wherein the parameter of communications device is the distance between the communications device and the infrastructure equipment.

Paragraph 32. A communications device according to Paragraph 30 or Paragraph 31, wherein the parameter of the communications device is a reference signal received power, RSRP, of signals received by the communications device from the infrastructure equipment.

Paragraph 33. A communications device according to any of Paragraphs 28 to 32, wherein the controller and the transmitter and configured in combination to transmit the first signal to the infrastructure equipment in accordance with values of the parameters defined by the suggested one of the plurality of uplink data transmission configurations.

Paragraph 34. A communications device according to any of Paragraphs 18 to 33, wherein the controller is configured in combination with the receiver to receive an indication of a suggested one of the plurality of uplink data transmission configurations from the infrastructure equipment as part of an RRC connection reconfiguration message indicating that a communications link between the communications device and the infrastructure equipment should be modified, the suggested one of the plurality of the uplink data transmission configurations being selected for the communications device by the infrastructure equipment based on a most recently known location of the communications device.

Paragraph 35. A communications device according to Paragraph 34, wherein the controller and the transmitter and configured in combination to transmit the first signal to the infrastructure equipment in accordance with values of the parameters defined by the suggested one of the plurality of uplink data transmission configurations.

Paragraph 36. A method of operating a communications device for transmitting data to or receiving data from an infrastructure equipment forming part of a wireless communications network, the infrastructure equipment providing a cell having a coverage area in which the communications devices is located, the method comprising
  determining a distance between the communications device and the infrastructure equipment,
  receiving, from the infrastructure equipment via a wireless access interface provided by the wireless communications network, an indication of one or more of a plurality of uplink data transmission configurations, the uplink data transmission configurations each defining different values of a set of one or more communications parameters in accordance with which the communications device is to transmit uplink data to the infrastructure equipment,
  determining that one of the indicated uplink data transmission configurations should be used to transmit uplink data to the infrastructure equipment dependent on distance between the communications device and the infrastructure equipment,
  transmitting, via the wireless access interface, a first signal comprising a random access preamble and uplink data to the infrastructure equipment in accordance with values of the parameters defined by the determined uplink data transmission configuration, and
  receiving, via the wireless access interface, a random access response message from the infrastructure equipment.

Paragraph 37. Circuitry for a communications device for transmitting data to or receiving data from an infrastructure equipment forming part of a wireless communications network, the infrastructure equipment providing a cell having a coverage area in which the communications devices is located, the communications device comprising
  transmitter circuitry configured to transmit signals to the infrastructure equipment via a wireless access interface provided by the wireless communications network,
  receiver circuitry configured to receive signals from the infrastructure equipment via the wireless access interface, and
  controller circuitry configured in combination with the receiver circuitry and the transmitter circuitry
  to determine a distance between the communications device and the infrastructure equipment,
  to receive from the infrastructure equipment an indication of one or more of a plurality of uplink data transmission configurations, the uplink data transmission configurations each defining different values of a set of one or more communications parameters in accordance with which the communications device is to transmit uplink data to the infrastructure equipment,
  to determine that one of the indicated uplink data transmission configurations should be used to transmit uplink data to the infrastructure equipment dependent on distance between the communications device and the infrastructure equipment,
to transmit a first signal comprising a random access preamble and uplink data to the infrastructure equipment in accordance with values of the parameters defined by the determined uplink data transmission configuration, and
to receive a random access response message from the infrastructure equipment.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] RP-172834, "Revised WID on New Radio Access Technology," NTT DOCOMO, RAN #78.
[7] ETSI TS 136 213 V13.0.0 (2016-01)/3GPP TS 36.212 version 13.0.0 Release 13.
[8] R2-168544, "UL data transmission in RRC_INACTIVE," Huawei, HiSilicon, RAN #96.
[9] R2-168713, "Baseline solution for small data transmission in RRC_INACTIVE," Ericsson, Ran #96.
[10] TR 38.889, V16.0.0, "$3^{rd}$ Generation Partnership Project; Technical Specification Group Radio Access Network; Study on NR-based Access to Unlicensed Spectrum; (Release 16)," 3GPP, December 2018.

What is claimed is:

1. An infrastructure equipment forming part of a wireless communications network for transmitting data to or receiving data from a plurality of communications devices, the infrastructure equipment providing a cell having a coverage area in which the plurality of communications devices are located, the infrastructure equipment comprising:
   transmitter circuitry configured to transmit signals to the communications devices via a wireless access interface provided by the wireless communications network,
   receiver circuitry configured to receive signals from the communications devices via the wireless access interface, and
   controller circuitry configured, in combination with the receiver circuitry and the transmitter circuitry, as part of a four-step random access procedure, to
   transmit to the plurality of communications devices an indication of one or more of a plurality of uplink data transmission configurations for transmission in a physical uplink shared channel (PUSCH), the plurality of uplink data transmission configurations each defining different values of a set of one or more communications parameters in accordance with which the plurality of communications devices are to transmit uplink data to the infrastructure equipment, each of the plurality of uplink data transmission configurations being defined for a predetermined range of distances between the communications devices and the infrastructure equipment,
   receive a first signal comprising a random access preamble and uplink data from one of the communications devices, and
   transmit a random access response message to the one of the communications devices,
   wherein the one or more of the plurality of uplink data transmission configurations defining the values of the communications parameters in accordance with which the uplink data of the first signal is received by the infrastructure equipment corresponds to a range of distances which includes a distance calculated based on a location of the one of the communications devices and a location of the infrastructure equipment.

2. An infrastructure equipment according to claim 1, wherein the one or more communications parameters comprise communications resources of the wireless access interface in which the uplink data of the first signal is to be transmitted by the plurality of communications devices.

3. An infrastructure equipment according to claim 2, wherein the uplink data is received from the one of the communications devices in a set of communications resources of the wireless access interface defined by one of the plurality of uplink data transmission configurations, wherein the random access preamble is associated with the set of communications resources.

4. An infrastructure equipment according to claim 1, wherein the one or more communications parameters comprise a modulation and coding scheme with which the uplink data of the first signal is to be transmitted by the plurality of communications devices.

5. An infrastructure equipment according to claim 1, wherein the one or more communications parameters comprise a transmission power with which the uplink data of the first signal is to be transmitted by the plurality of communications devices.

6. An infrastructure equipment according to claim 1, wherein the controller is configured in combination with the transmitter to broadcast the indication of all of the plurality of uplink data transmission configurations to be receivable by one or more of the plurality of communications devices.

7. An infrastructure equipment according to claim 1, wherein the controller is configured in combination with the transmitter to signal the indication of all of the plurality of uplink data transmission configurations directly to one or more of the plurality of communications devices.

8. An infrastructure equipment according to claim 1, wherein the indication of the one or more of the plurality of uplink data transmission configurations are signalled in at least one system information block.

9. An infrastructure equipment according to claim 1, wherein the indication of the one or more of the plurality of uplink data transmission configurations are fixed and predefined.

10. An infrastructure equipment according to claim 1, wherein the controller is configured, in combination with the transmitter, to transmit an indication of a suggested one of the plurality of uplink data transmission configurations to one or more of the plurality of communications devices as part of a radio resource control (RRC) release message indicating that a communications link between the one or more of the communications devices and the infrastructure equipment should either be released or suspended, the suggested one of the plurality of the uplink data transmission configurations being selected for each of the one or more of the plurality of communications devices by the infrastructure equipment based on a most recently known location of the each of the one or more of the plurality of communications devices.

11. An infrastructure equipment according to claim 10, wherein the RRC release message comprises an indication of a validity timer defining a period for which the suggested uplink data transmission configuration remains valid for defining how the one or more of the communications devices should transmit uplink data to the infrastructure equipment.

12. An infrastructure equipment according to claim 10, wherein the RRC release message comprises an indication of a boundary within which a parameter of the one or more of the communications devices must remain for the suggested uplink data transmission configuration to remain valid for defining how the one or more of the communications devices should transmit uplink data to the infrastructure equipment.

13. An infrastructure equipment according to claim 12, wherein the parameter of the one or more of the communications devices is the distance between the one or more of the communications devices and the infrastructure equipment.

14. An infrastructure equipment according to claim 12, wherein the parameter of the one or more of the communications devices is a reference signal received power (RSRP) of signals received by the one or more of the communications devices from the infrastructure equipment.

15. The infrastructure equipment according to claim 10, wherein the one of the communications devices is in an inactive state.

16. An infrastructure equipment according to claim 1, wherein the controller is configured, in combination with the transmitter, to transmit an indication of a suggested one of the plurality of uplink data transmission configurations to one or more of the plurality of communications devices as part of a radio resource control (RRC) connection reconfiguration message indicating that a communications link between the one or more of the communications devices and the infrastructure equipment should be modified, the suggested one of the plurality of the uplink data transmission configurations being selected for each of the one or more of the plurality of communications devices by the infrastructure equipment based on a most recently known location of the each of the one or more of the plurality of communications devices.

17. The infrastructure equipment according to claim 16, wherein the one of the communications devices is in a connected state.

18. The infrastructure equipment according to claim 1, wherein the one of the communications devices is in an idle state.

19. A method of operating an infrastructure equipment forming part of a wireless communications network for transmitting data to or receiving data from a plurality of communications devices, the infrastructure equipment providing a cell having a coverage area in which the plurality of communications devices are located, the method comprising:
transmitting, as part of a four-step random access procedure and to the plurality of communications devices via a wireless access interface provided by the wireless communications network, an indication of one or more of a plurality of uplink data transmission configurations for transmission in a physical uplink shared channel (PUSCH), the plurality of uplink data transmission configurations each defining different values of a set of one or more communications parameters in accordance with which the plurality of communications devices are to transmit uplink data to the infrastructure equipment, each of the plurality of uplink data transmission configurations being defined for a predetermined range of distances between the communications devices and the infrastructure equipment,
receiving, via the wireless access interface, a first signal comprising a random access preamble and uplink data from one of the communications devices, and
transmitting, via the wireless access interface a random access response message to the one of the communications devices,
wherein the one or more of the plurality of uplink data transmission configurations defining the values of the communications parameters in accordance with which the uplink data of the first signal is received by the infrastructure equipment corresponds to a range of distances which includes a distance calculated based on a location of the one of the communications devices and a location of the infrastructure equipment.

20. A method of operating a communications device for transmitting data to or receiving data from an infrastructure equipment forming part of a wireless communications network, the infrastructure equipment providing a cell having a coverage area in which the communications devices is located, the method comprising:
determining a distance between the communications device and the infrastructure equipment based on a location of the communications device and a location of the infrastructure equipment,
receiving, as part of a four-step random access procedure and from the infrastructure equipment via a wireless access interface provided by the wireless communications network, an indication of one or more of a plurality of uplink data transmission configurations for transmission in a physical uplink shared channel PUSCH), the uplink data transmission configurations each defining different values of a set of one or more communications parameters in accordance with which the communications device is to transmit uplink data to the infrastructure equipment, each of the plurality of uplink data transmission configurations being defined for a predetermined range of distances between the communications devices and the infrastructure equipment, determining that one of the indicated uplink data transmission configurations should be used to transmit uplink data to the infrastructure equipment when the one of the indicated uplink data transmission configurations corresponds to a range of distances which includes the distance between the communications device and the infrastructure equipment, transmitting, via the wireless access interface, a first signal comprising a random access preamble and uplink data to the infrastructure equipment in accordance with values of the parameters defined by the determined uplink data transmission configuration, and receiving, via the wireless access interface, a random access response message from the infrastructure equipment.

* * * * *